July 3, 1962 J. B. HOLMES 3,042,208
COMBINED WASHER, SEPARATOR AND GRADER FOR LOOSE MATERIALS
Filed Jan. 31, 1961 6 Sheets-Sheet 1

INVENTOR.
JOHN B. HOLMES
BY
his ATTORNEY.

July 3, 1962 J. B. HOLMES 3,042,208
COMBINED WASHER, SEPARATOR AND GRADER FOR LOOSE MATERIALS
Filed Jan. 31, 1961 6 Sheets-Sheet 2

INVENTOR.
JOHN B. HOLMES
BY
his ATTORNEY.

July 3, 1962  J. B. HOLMES  3,042,208
COMBINED WASHER, SEPARATOR AND GRADER FOR LOOSE MATERIALS
Filed Jan. 31, 1961  6 Sheets-Sheet 3
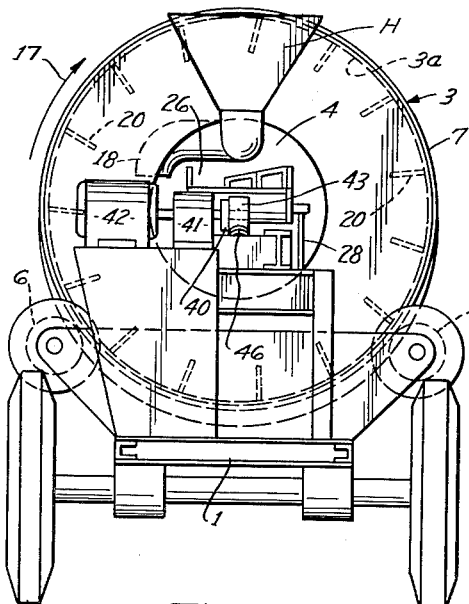
Fig. 3.
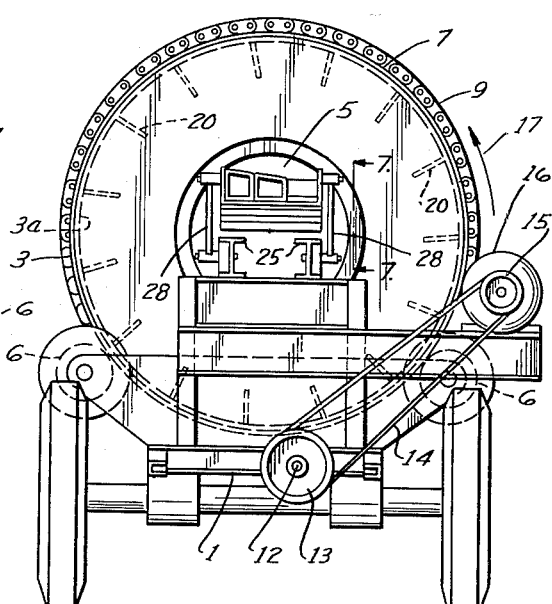
Fig. 4.
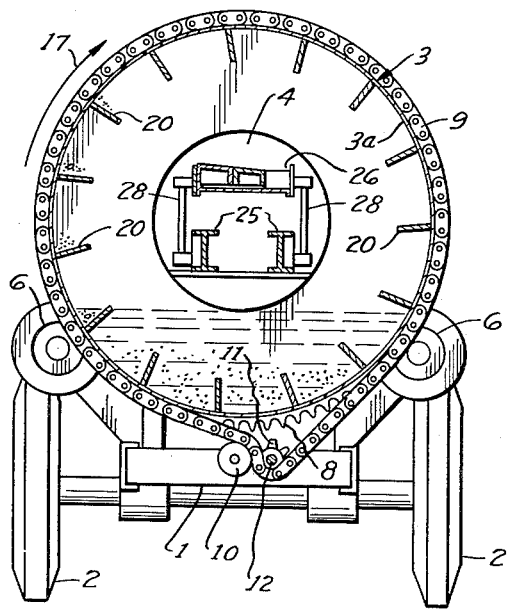
Fig. 6.
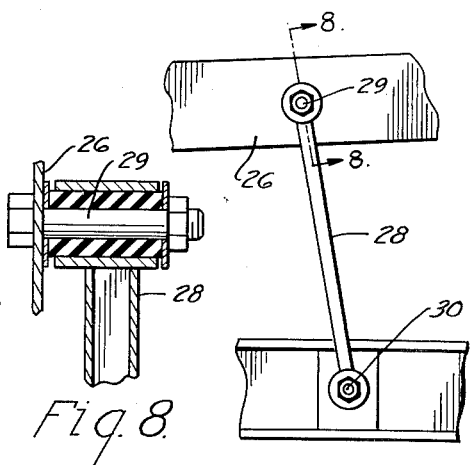
Fig. 8.
Fig. 7.
INVENTOR.
JOHN B. HOLMES
BY
his ATTORNEY.

July 3, 1962 J. B. HOLMES 3,042,208
COMBINED WASHER, SEPARATOR AND GRADER FOR LOOSE MATERIALS
Filed Jan. 31, 1961 6 Sheets-Sheet 4
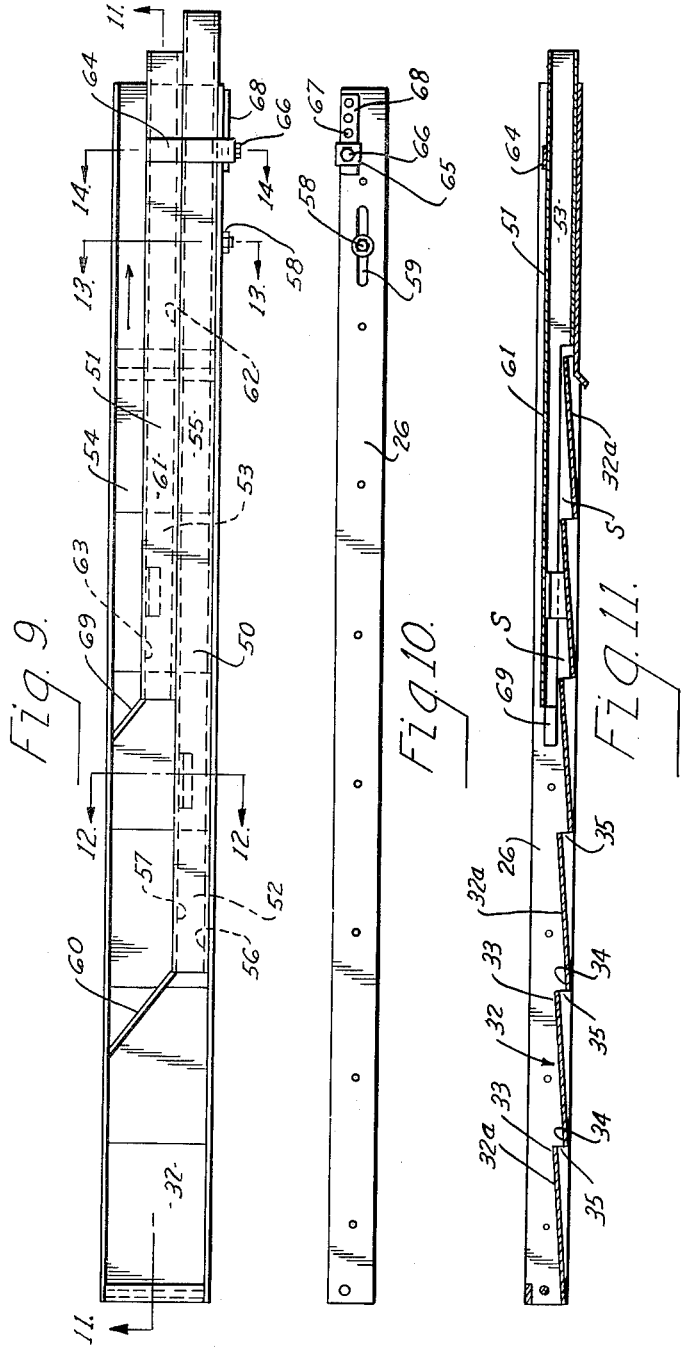
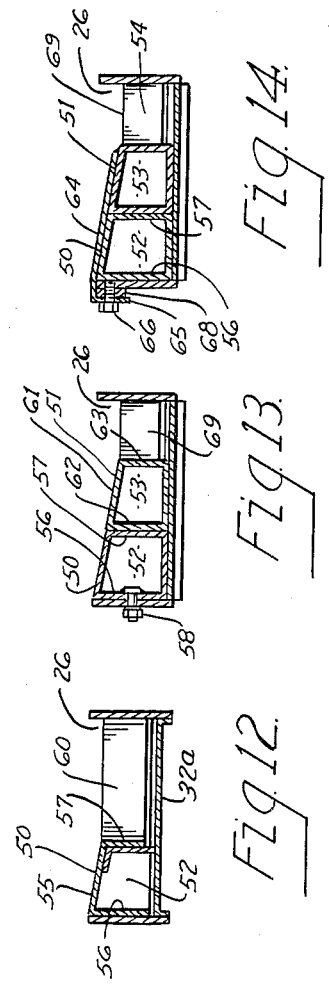
INVENTOR.
JOHN B. HOLMES
BY
*his* ATTORNEY.

July 3, 1962

J. B. HOLMES 3,042,208

COMBINED WASHER, SEPARATOR AND GRADER FOR LOOSE MATERIALS

Filed Jan. 31, 1961

INVENTOR.
JOHN B. HOLMES
BY
his ATTORNEY.

July 3, 1962 J. B. HOLMES 3,042,208
COMBINED WASHER, SEPARATOR AND GRADER FOR LOOSE MATERIALS
Filed Jan. 31, 1961 6 Sheets-Sheet 6

INVENTOR.
JOHN B. HOLMES
BY
his ATTORNEY.

3,042,208
COMBINED WASHER, SEPARATOR AND GRADER FOR LOOSE MATERIALS
John B. Holmes, R.D. 1, Burton, Ohio
Filed Jan. 31, 1961, Ser. No. 86,167
13 Claims. (Cl. 209—442)

This invention relates to an apparatus for washing loose material with liquid and for removing or separating the material from the washing liquid.

More particularly, the invention relates to a continuous method of washing with liquid a mixture of loose material and contaminating solids capable of forming a slurry when mixed with a liquid by violently churning a mixture of the liquid, contaminating solids and material together, then continuously separating the churned material and residual slurry preliminarily by settling of the material out of the slurry and decanting the slurry from the surface of the settled-out material, and then conveying the settled-out material and residual slurry to a discharge site and, concurrently with the conveying operation, repeatedly loosening and settling out the material from the residual slurry, compacting the material, and draining the residual slurry off of the upper surface of the material, all as the material progresses toward the discharge site.

For the purposes of illustration, the invention will be described as applied to the washing of bank run sand with water, its use in connection with other loose material and liquid being readily apparent from the illustrative example.

The term "sand" is used herein in its broader sense to include not only true sand but a mixture of sand and gravel such as passes through the usual coarse screens; for example, gravel of less than an inch, or, usually, about one-half of an inch or less.

Deposits of sand are such that they do not retain free water readily. Consequently, water usually is not readily available at the site of the sand pits in adequate quantity to wash the sand and gravel thoroughly with clear water. The general practice is to provide, adjacent the pit, a large clay-lined basin or sump into which the slurry of washing water, clay, and silt, are discharged for settling preparatory to reuse. The slurry usually discharged into the basin adjacent one end and the water removed therefrom adjacent the other end so as to afford as much time as possible for settling of the clay and silt out of the used wash water.

The conventional practice in washing the sand is to mix the sand and large quantities of water and discharge the mixture onto suitable screens or into piles so that the water can drain out downwardly through the sand and out at the bottom of the supported or piled sand. In other instances, the sand is lifted from the water by screw or endless belt and bucket conveyors. However, wear on this type of equipment is very great and discourages its use.

The sand generally contains substantial amounts of very fine clay and silt which become suspended in the water during the washing operation. As the residual water drains through the sand and gravel, the sand itself acts as a filter. Consequently, unless extremely large quantities of water are used so as to dilute the suspension of clay and silt greatly during washing and before discharge of the sand, unduly large amounts of the clay and slit are filtered out by, and retained in, the piled sand. Thus, washing the sand requires such vast amounts of relatively clear water that often the amount required for effective washing exceeds the supply available at the site.

Also, due to the large amount of water to be handled at sand pits under these conditions, the washing, cleaning, and dehydrating apparatus generally must be a rather large and permanent installation. Small portable installations effective for these combined purposes using small amounts of water have not been devised heretofore.

In accordance with the present invention, sand and water are mixed thoroughly by churning the two together so that the clay and silt in the sand become suspended in the water at a relatively high concentration and form therewith a slurry. Thereupon, successive batches of the intermixed sand and slurry are conveyed initially part way toward the ultimate discharge site. During this initial conveyance, the sand is settled out of the slurry preliminarily and the slurry decanted from the surface. The settled-out sand and residual slurry is then conveyed to its ultimate discharge site. During the latter conveyance, it is agitated in a manner such that the individual particles of sand are repeatedly loosened and separated from each other and caused to pass downwardly in loosened condition through the residual slurry and settle out of the residual slurry onto their conveyor as a compact layer. The solids of the residual slurry, are not filtered out by the sand, but, instead, the slurry is drained off of the surface of the compacted layer being conveyed and is discharged to a sump. All of these steps are repeated in rapid succession many times during conveyance. As a result, the sand does not act as a filter and remove the suspended silt and mud from the residual slurry as happens when the mixture of sand and slurry is discharged onto screens and porous belts, or into piles, for draining away the residual water through the sand. Instead, the water retains the suspended silt and mud and, when squeezed out as a slurry onto the surface of the temporarily compacted sand, drains off, conveying them away with it. These steps are effected generally by first continuously dipping up successive batches of the sand, silt, clay, and water mixture in impervious walled buckets, and allowing the sand to settle to the bottom of the buckets as the buckets convey it to a point at which it is to be discharged onto a conveyor. During this step in the operation, the slurry of silt, clay and water, from which the sand has settled out preliminarily, is decanted by pouring it off the surface. Thereafter, the sand with residual slurry therein is discharged onto the conveyor which conveys the sand to the ultimate discharge site. During conveyance, the conveyor vibrates or orbits rapidly in such a manner that the sand particles are thrown upwardly and forwardly in the direction of discharge and loosened and, while in loose condition, drop back while still advancing and pass downwardly through the residual slurry and settle out, being partially compacted on a supporting surface of the conveyor for an instant at each vibration so as to free the residual slurry at the upper surface of the sand. The freed residual slurry thereupon is brought to the upper surface and drains away continuously over the upper surface of the sand mass in a direction opposite to the advance of the sand, instead of filtering through it.

As a result, a much higher concentration of mud and silt in the washing water can be tolerated without reducing the cleanliness of the sand. Also, more residual slurry is removed from the sand. Correlatively, much less water is necessary per cubic foot of sand washed and relatively small equipment can handle effectively a much larger quantity of sand than was heretofore possible. As an added refinement, the finer sand particles, which tend to remain suspended longer in the water, can be separated from the coarser particles during the same operations and by the same apparatus that performs the washing, separating, and dehydrating steps; so that, along with the separating, washing and dehydrating, the sand can be graded during its conveyance to the discharge site.

The principal object of the invention is to separate loose materials more effectively from the washing liquid and its suspended matter so as not only to remove more of the liquid and leave the material in a cleaner and drier condition at the time of discharge, but also to remove the slurry of liquid and suspended solids from the upper surface of the material so that the liquid is not filtered by the material but the material passes in loose condition through the liquid and settles out of the liquid.

Another object is to provide a simple apparatus for effecting the operations above described while concurrently conveying the material from the washing site to the discharge site.

A more specific object is to provide an apparatus for effecting the operations. The apparatus includes a rotary, imperforate walled drum washer into which water and sand are introduced at one end and which is arranged to churn the sand and water so as to thoroughly intermix them, whereby the silt, clay and water form a slurry. The drum has imperforate buckets on its inner wall. These buckets continuously hoist successive batches of the mixed sand and slurry while allowing the sand to settle out of the slurry into the bottom of the buckets. They decant the slurry from the surface of the sand as they tilt during lifting of the sand to the point of discharge. They discharge the sand and residual slurry onto the solid bottom wall of a conveyor which slopes upwardly lengthwise from the inlet end of the drum to and beyond the discharge end. The conveyor vibrates or orbits rapidly in a manner such as to advance the sand step by step in very short increments of travel continuously toward the discharge end of the conveyor. The same vibratory action loosens the sand and causes the particles to fall back and settle out of the residual slurry. The conveyor is arranged so that the residual slurry flows off of the upper surface of the sand and drains away, instead of seeping and filtering through the sand.

Another object of the invention is to provide a small, compact, efficient, and portable combined washer, separator, dehydrator, and conveyor for cleaning the sand, removing the water from it, conveying it to the point of discharge and grading it preparatory to discharge.

Various other objects and advantages of the present invention will become apparent from the following description, wherein reference is made to the drawings, in which:

FIGS. 3 and 4 are left-hand and right-hand elevations, respectively, of the apparatus illustrated in FIG. 2;

FIG. 5 is a vertical longitudinal sectional view through the apparatus and is taken on the line 5—5 in FIG. 1;

FIG. 6 is a vertical cross sectional view and is taken on the line 6—6 in FIG. 2;

FIG. 7 is an enlarged side elevation showing the mounting of the conveyor of the present invention;

FIG. 8 is a further enlarged sectional view taken on the line 8—8 in FIG. 7;

FIG. 9 is an enlarged fragmentary top plan view of the conveyor shown in FIGS. 1 through 8;

FIG. 10 is a side elevation of the conveyor;

FIG. 11 is a vertical longitudinal section view of the conveyor taken on the line 11—11 of FIG. 9;

Figure 17:
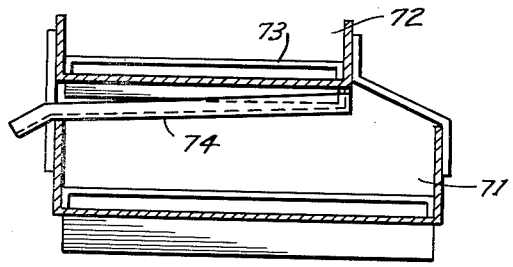
Figure 15:
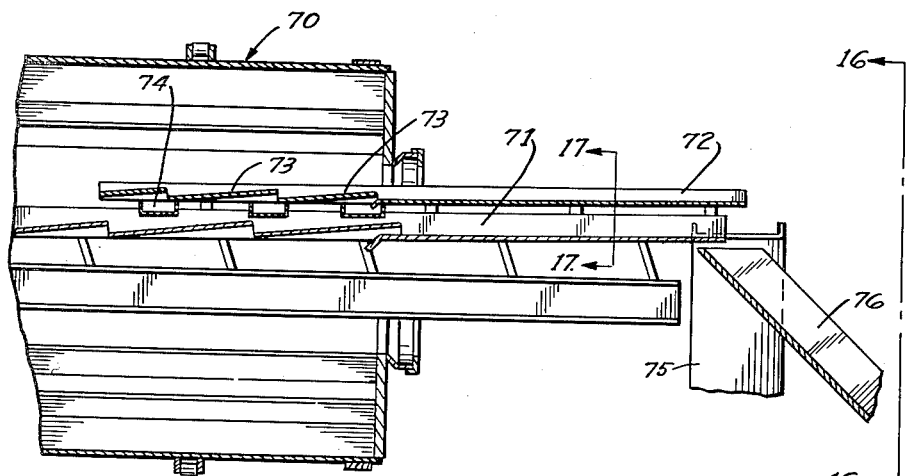
Figure 16:
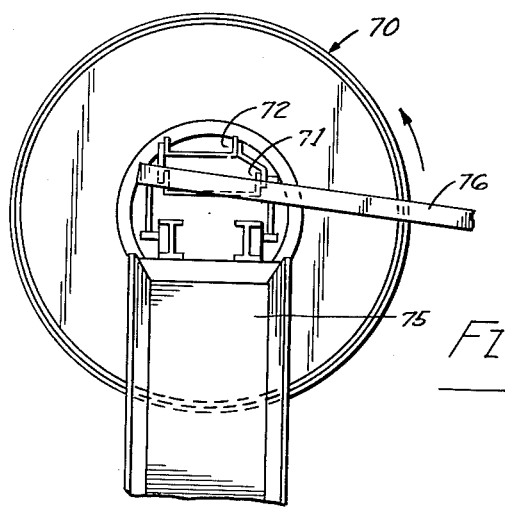
Figure 18:
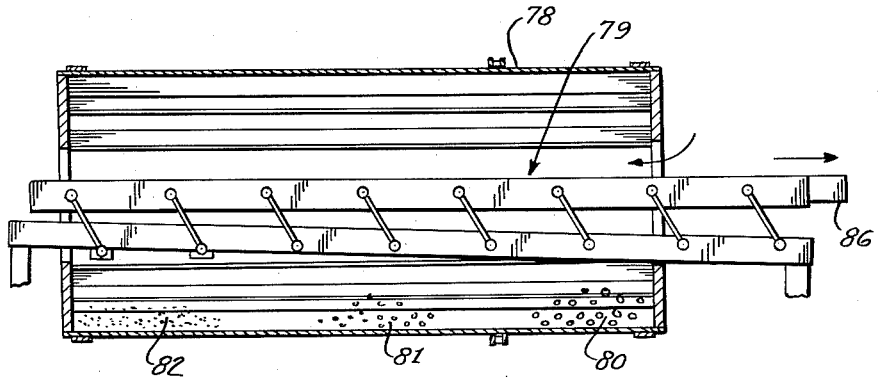
Figure 19:
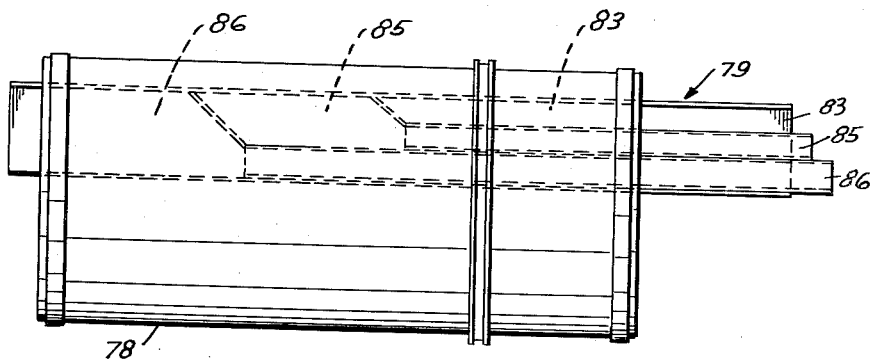

FIGS. 12 through 14 are vertical cross sectional views of the conveyor and are taken on the lines 12—12, 13—13, and 14—14, respectively, of FIGS. 9 and 10;

FIG. 15 is a fragmentary vertical longitudinal sectional view similar to FIG. 5, but showing a modified form of conveyor;

FIG. 16 is a right end elevation of the structure illustrated in FIG. 15, as viewed from the line 16—16 therein;

FIG. 17 is an enlarged fragmentary vertical cross sectional view taken on the line 17—17 of FIG. 15;

FIG. 18 is a diagrammatic vertical sectional view similar to FIG. 5, showing a modified relation of the parts thereof; and FIG. 19 is a diagrammatic top plan view illustrating certain operating characteristics due to the modified relation.

Referring to the drawings, the apparatus comprises a suitable supporting frame 1 which is mounted on wheels 2 so as to be readily transportable. Mounted on the frame 1 is a rotatable drum 3 having an imperforate peripheral wall 3a and having an inlet opening 4 at one end and a discharge opening 5 at the opposite end. The drum is arranged with its axis sloping very slightly downwardly from the horizontal from the inlet end toward the discharge end for discharging wash water therefrom.

For supporting the drum for rotation about its axis, a plurality of rollers 6 are mounted on the support and engage suitable circumferential tracks 7 on, and near the ends of, the drum. For rotating the drum about its axis, the drum is provided with a sprocket 8 which is drivingly connected to a chain 9. The chain 9 passes over an idler roll 10 to a driving sprocket 11 which is mounted on a suitable shaft 12 carried on the frame. The shaft carries a driving pulley 13 which is driven by a suitable belt 14 by a driving pulley 15. The driving pulley 15 is driven through suitable gear reduction and motor mechanism 16. Thus the drum is rotated unidirectionally, as indicated by the arrow 17 in FIG. 6.

A suitable feed pipe 18 introduces the mixture of water and sand from a hopper H into the inlet end 4 of the drum. A discharge chute 19 is provided for receiving the sand from the drum and discharging it, as will later be described. Due to the slope of the drum downwardly from the input end, the water and sand mixture tend to migrate toward the discharge end and the excess water flows out through this discharge end.

Arranged within the drum is a plurality of imperforate paddles 20 which extend longitudinally of the drum and at an angle to the peripheral wall 3a of the drum. At the ends, the spaces between them and the drum wall are closed so that, on the rising side of the drum, they act as upwardly open imperforate walled troughs or buckets for conveying the mixture of water, sand, silt, and clay upwardly from the bottom of the drum and for dropping the sand downwardly after the paddles reach a predetermined elevation and tilted position. As they rise, the sand settles out of the slurry of water, silt, and clay and the slurry is decanted by pouring it off the surface of the settled-out sand. The sand and gravel they discharge contains residual slurry only.

Disposed within the drum and extending from substantially the inlet end thereof outwardly and beyond the discharge end, is a combined conveyor, separator, and dehydrator, comprising a frame in the form of a pair of longitudinal sills 25 on which is supported a conveyor in the form of an upwardly open trough 26 which extends through the drum adjacent the axis thereof. The trough 26 is arranged to receive materials discharged from the buckets as they reach the upper part of their path of rotation about the axis of the drum. For this purpose, it is preferably open at the top throughout that portion of its length along which material is to be discharged from the buckets, thus giving a very simple and direct feed of the sand and residual slurry into the trough. However, if desired, suitable deflectors or chutes may be provided along the length of the drum for receiving the sand discharged from the buckets and, in turn, discharging it into the trough, as later described herein.

Usually, the water level in the drum is slightly above the lower periphery of the discharge opening 5 so that the sand is completely immersed in water and is picked up with the water at the bottom of the drum by the paddles 20. As it is lifted by the buckets, the sand settles in loose condition through the slurry of water and fines. The excess slurry is decanted by pouring it off the top of the sand by the buckets thus formed, and drops back into the drum. The decanting is gradual as the paddles rise and become tilted at an increasingly greater angle to the horizontal.

The trough 26 is arranged so that this decanted initial slurry does not fall into it, but falls in a path outside of the trough back into the drum. In the form illustrated, this is done by using a trough 26 which is relatively narrow in a direction transversely of the drum and positioning it so that its side adjacent to the upward travelling side of the drum is spaced sufficiently far away therefrom so that the slurry pouring out of the buckets passes back into the drum in the space between the rising buckets and the trough.

As the buckets proceed so that they approach more nearly the vertical, and hence an inverted position the sand and residual slurry fall into the trough wherein the conveying operation and further removal of slurry are effected.

The trough 26 extends from one end of the drum to and outwardly beyond the other end of the drum, as indicated at 27, so that it can discharge into the chute 19. The trough is arranged so that its bottom wall slopes upwardly at a slight angle in a direction toward the discharge end of the trough 26. Thus, as the sand is moved upwardly along the trough, any slurry separated therefrom onto the top of the sand tends to drain back along the trough in a direction toward the lower end of the trough. A considerable amount of residual slurry remains in the sand when it is deposited on the trough so that, if it were separated and not drained from the trough, a substantial flow rearwardly or toward the lower end of the trough would result. This would wash a large amount of sand backwardly along the conveyor.

In order to advance the material and still drain it effectively, the trough 26 is arranged to vibrate or oscillate slightly endwise of the drum. Suitable supporting means for this purpose are provided, and in the form illustrated comprise a plurality of links 28 which are of equal length and which are arranged parallel to each other. These links are connected at their upper ends by pivots 29 and to the trough 26. They are connected by like pivots 30 at their lower ends to the sills 25. All of the links 28 are parallel to each other and preferably are spaced equidistantly from each other. Each link slopes from its point of connection with the trough downwardly forwardly of the trough in the conveying direction.

As a result of this arrangement, as the trough is pushed forwardly or in the conveying direction, it orbits in an upwardly convex path, moving upwardly and forwardly concurrently. On the other hand, as it returns it follows a like path downwardly and rearwardly. The trough is vibrated or oscillated along its path very rapidly. This throws the sand upwardly and forwardly, freeing it from the bottom of the trough 26 and loosening it. It falls back onto the trough in loose condition while still travelling forwardly, and so settles out of the residual slurry. Due to its impact with the bottom of the trough, it is somewhat compacted for an instant progressively from the bottom of the pile upwardly. This tends to squeeze the residual slurry out and upwardly to the upper surface of the sand. These rapidly repeated vibrations progressively move the sand upwardly along the trough at the same time that it is being repeatedly loosened and compacted and settled out of the residual slurry.

To assure that the residual slurry doesn't filter downwardly through the sand, the trough 26 has an imperforate bottom wall 32 which, as mentioned, has a general slope upwardly from the inlet end of the trough to the upper or discharge end. This bottom wall is made up of a plurality of separate portions, indicated at 32a, each of which slopes upwardly from the lower end of the trough toward the upper end at an angle slightly greater than the general slope of the trough 26. Each of these portions 32a is arranged so that its highest edge 33 is at or beyond the lower margin 34 of the next succeeding portion 32a in a direction toward the discharge end of the trough. Thus, after the sand is moved along a portion 32a for a certain distance, it then tumbles off the end thereof and thereby is further loosened.

Suitable passage means are provided at or adjacent the edges 33 and the margins 34 for draining away the residual slurry which accumulates on the upper surface of the sand. The most effective manner of providing the passage means is by having the edges 33 of each portion 32a spaced a distance above the margin of the next succeeding portion 32a, and leaving the space between the edges and margins unobstructed so as to provide passages 35. These passages are substantially coextensive in width with the trough and the freed residual slurry can flow off the top of the material and escape through them readily. As mentioned, the wall portions 32a are imperforate so that the slurry must flow off of the top of the material to be discharged from the trough and cannot filter down through the material and penetrate the trough bottom wall.

Figure 2:
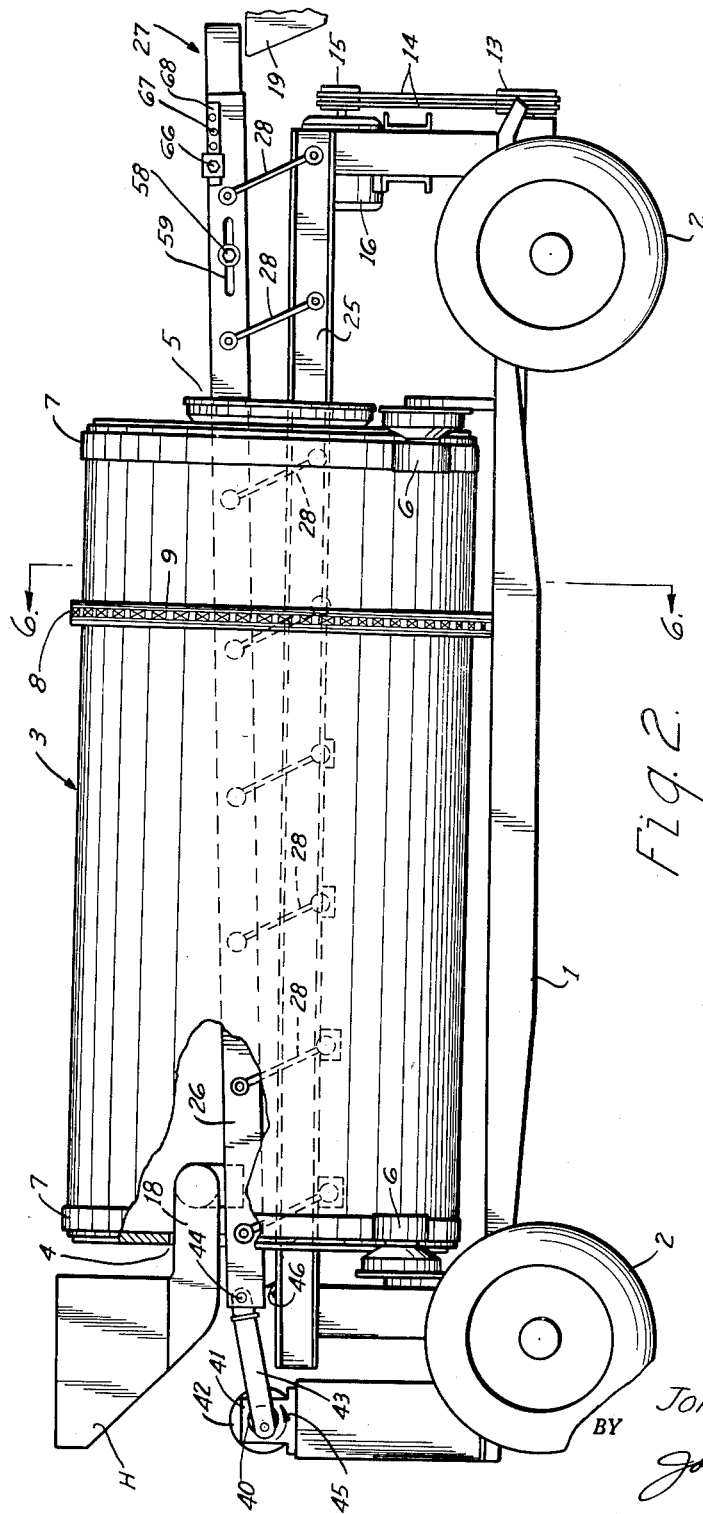
FIG. 2 is a front elevation of the apparatus illustrated in FIG. 1.

In order to vibrate or orbit the trough, a suitable eccentric drive 40 is provided. The eccentric drive is driven through suitable reduction gearing 41 by an electric or other motor 42. A connecting rod 43 is pivotally connected at one end to the eccentric drive 40, and pivotally connected at the other end, as indicated at 44, to the trough 26 so that upon rotation of the eccentric the trough will be vibrated. The axis of the eccentric shaft is normally spaced below the level of the axis of the pivot 44 and the eccentric drive is in the direction indicated by the arrow 45 in FIG. 2. As a result of this arrangement, a substantial component of the rotational movement of the eccentric as it drives the trough forwardly is vertical. However, the eccentric axis is close to the level of the axis 44, so that a larger component of its rotational movement, as the eccentric moves to return the trough, is horizontal. Therefore, the trough is moved forward gradually and returned rapidly. As a result, the sand is transported and moves with the trough forwardly, but as the trough is returned, it is suddenly pulled out from beneath the sand so that the sand is suddenly dropped and falls through the air back onto the bottom wall at an advanced position along the trough, only to be almost immediately lifted and thrown forward again, or struck by other sand already rising from the bottom wall.

As a result, the sand is successively loosened and compacted so that the residual slurry is brought to the upper surface. This slurry flows over the top surface of the sand and downwardly and outwardly through the passages 35 and back into the drum.

Due to the inertia of relatively heavy moving parts, a suitable compression spring 46 is provided between an abutment 47 on the feed end of the trough 26 and a suitable stationary abutment 48 on the frame. This spring preferably slopes upwardly about 30° to the horizontal in a direction toward the discharge end of the trough. As the trough returns, it is lighter because part of the sand and slurry has been discharged. Thus, as the trough is returned rapidly, the spring is compressed so that toward the end of the return movement of the trough, the spring has absorbed the inertial stresses, brought the trough to a rest, and stored energy for restarting and urging the trough in the opposite direction, thus reducing the stresses to which the apparatus otherwise would be subjected.

Generally, the slope of the trough is about that shown in the drawing, but it may be varied. If the slope is increased too much, the slurry runs rearwardly too fast, carrying with it the sand and reducing the efficiency. If the vibration is too rapid, both the sand and the slurry will be conveyed by the trough to the discharge end without separating, or both will merely vibrate up and down without advancing. Generally, it is found best to use a vibrating stroke of from about 1¼ to 2 inches, measured from maximum advance to fully returned positions, and to vibrate the trough at from 250 to 500 revolutions per minutes. Of course, these figures vary depending upon the coarseness and type of sand and gravel. However, a few runs can demonstrate readily the best speed and slope to use for the particular material at hand and usually this remains quite consistent for sand taken throughout a large portion of the sand bed for long runs.

Too slow a vibration does not effect a good separation, or advance the sand rapidly enough, or cause the sand to rise from the surface of the bottom wall of the trough. It may be that the substantial separation is effected because of the downcoming sand being struck by the upcoming bottom wall and thus is compressed alternately and then released, thus squeezing out the residual slurry which, during compression, flows rearwardly over the top surface of the compacted sand. In any event, as the sand is discharged from the discharge end of the trough onto the chute 19, it contains much less water than is generally contained in sand cleaned and washed by comparable prior methods.

It is noted in operation that coarser particles tend to settle out of the water quickly and to be picked up and discharged nearer to the input end of the drum by the buckets or paddles. These coarse particles fall off readily onto the conveyor as the paddles approach the position directly above the conveyor. However, the finer particles tend to pack between the paddles and drum wall and adhere to the walls and not discharge as readily. Quite often this continues until substantial amounts of the fine particles accumulate in the buckets. Furthermore, the finer sand particles wash down toward the discharge end of the drum as a result of remaining longer suspended in the water of the drum which is flowing continuously toward the discharge end. As a result of both of these factors, larger amounts of the fine sand are discharged from the buckets up near the discharge end of the drum. Thus, there is a partial separation of the fine from the coarse particles.

To take advantage of these phenomena when grading of the material is desired concurrently with the conveyance and separation or dehydration, the applicant provides deflectors in the trough 26. These deflectors, indicated generally at 50 and 51, divide the trough into a plurality of segregated trough portions 52, 53, and 54, respectively, which are arranged side by side and extend lengthwise of the trough.

The deflector 50 comprises an inverted channel having a top wall 55 and side walls 56 and 57 which may rest on the bottom wall of the trough. At one portion along its length, it is connected by a bolt 58 and nut to one side wall of the trough. The bolt extends through an elongated slot 59 in the trough side wall, so that the deflector can be adjusted endwise of the trough and secured in adjusted position. The deflector 50 extends from the discharge end of the trough part way toward the receiving end of the trough. It terminates in spaced relation to the receiving end in a lateral deflecting wall 60. The deflecting wall 60 extends from the wall 57 to the other wall of the trough so that all material falling onto the trough between the receiving end of the trough 26 and the wall 60 is directed along the trough into the open or receiving end of the trough portion 52.

Correspondingly, the deflector 51 has a top wall 61 and side walls 62 and 63 which may rest upon the bottom wall of the trough. The deflector 51 is provided with a suitable strap 64 which overlies the top wall 55 of the deflector 50 and which is provided at the outer end with a downturned flange 65. A bolt 66 extends through an aperture in the flange 65 and can engage any one of a series of threaded openings 67 in a strap 68 which is secured to one side wall of the trough 26. Thus the deflector 51 can be adjusted endwise of the trough independently of the deflector 50 and clamped tightly against the deflector 50 in the adjusted position. The deflector 51 has a lateral deflecting wall 69 at the receiving end of the trough portion 53. The wall 69 extends transversely of the trough from the wall 63 to the same wall of the trough as did the deflecting wall 60. As a result, all material falling into the trough 26 between the wall 60 and the wall 69 is directed into the open receiving end of the trough portion 53. The trough portion 54 is uncovered. The top walls 55 and 61 slope downwardly transversely of the trough 26 toward the trough portion 54 and form a continuous planar cover so that material falling on either top wall moves transversely of the trough and falls into the nearest uncovered one of the trough portions 53 and 54.

By adjusting the deflectors endwise of the trough, different gradations of the material as to size can be obtained. Usually, moving the deflectors toward the inlet end of the drum, which is to the left in FIG. 5, increases the coarseness of the material received in trough portions 53 and 54. Moving them to the right in FIG. 5 tends to permit progressively less coarse material to enter. This is because the material discharged onto the trough by the drum usually is coarsest at the inlet end of the drum or trough and finest at the discharge end of the drum, there being a progressive gradation from one end of the drum toward the other.

If, as is later described in connection with FIGS. 18 and 19, the discharge end of the trough, which is the higher end, is arranged at the inlet end of the drum, then, since the finer material is discharged into the trough at the discharge end of the drum, movement of the deflectors toward the inlet end of the drum decreases the coarseness of the material received by different portions of the trough.

It is to be noted, as shown in FIG. 11, for example, that the bottom edges of the walls 56, 57, 62 and 63 engage the upper edges of the sloping wall portions 32 of the trough 26. Thus, between the bottom edges of the walls 56, 57 and 62, and the upwardly sloping bottom portions 32 of the trough there are small V-shaped open spaces, such as indicated at S, beneath the side walls of the deflectors and the bottom wall of the trough. However, since all of the sand in the trough is urged endwise of the trough, and since all three of the portions 52, 53 and 54 of the trough contain substantial layers of the sand, there is no appreciable migration of the sand transversely of the trough through these spaces. Such small amount as might migrate does not materially effect the result as only approximate and not extremely precise grading is desired. If, of course, it is desired that these spaces S be closed, suitably notched runners can be disposed beneath the edges of the deflector walls so as to close the spaces while permitting ease in sliding the deflectors longitudinally into adjusted positions.

Additional clamping bands may be clamped about the deflectors, if desired, to prevent their displacement during vibration, or the deflectors may be permanently welded or bolted in position.

It is to be noted that the number of deflectors and resultant trough portions used depends upon the fineness of gradation desired. The more deflectors, each having its inlet or feeding space at a different position along the length of the trough, the more precise is the degree of gradation.

Referring next to FIGS. 15 through 17, a different arrangement is shown. The drum, indicated at 70, is in all respects the same as the drum 2 heretofore described. The trough 71 may have one portion the same as the entire trough 26 heretofore described, without the partitions and deflecting means. Instead of the deflecting means, the other trough portion is in the form of a supplemental trough 72 arranged above the trough 71 and extending only part way from the discharge end thereof toward the receiving end. The trough portion 72 is also provided with a bottom wall which slopes upwardly generally parallel to the wall of the trough portion 71, and also is arranged to have a plurality of bottom wall portions 73 corresponding to the portions 32 of the trough 26. The portion 72 is less in width than the trough portion 71. Suitable drain channels 74 are provided at the underside of the portion 72 to receive the water discharged between the bottom portions 73 and deflect it beyond the side of the trough portion 71. Chutes 75 and 76 are provided for these portions, respectively, so as to discharge the graded sand to different locations. The trough portion 72 is generally arranged to extend into that part of the drum in which the fines are discharged from the paddles or buckets of the drum. Thus coarser material falls into the trough portion 71 and the finer material into the trough portion 72.

If desired, the slope of the trough portion 72 may be different from that of the portion 71, depending on the optimum slope for the particular size of sand being separated on the different portions. If such is desired, the portion 72 is merely welded to the portion 71 in the selected position.

Figure 1:
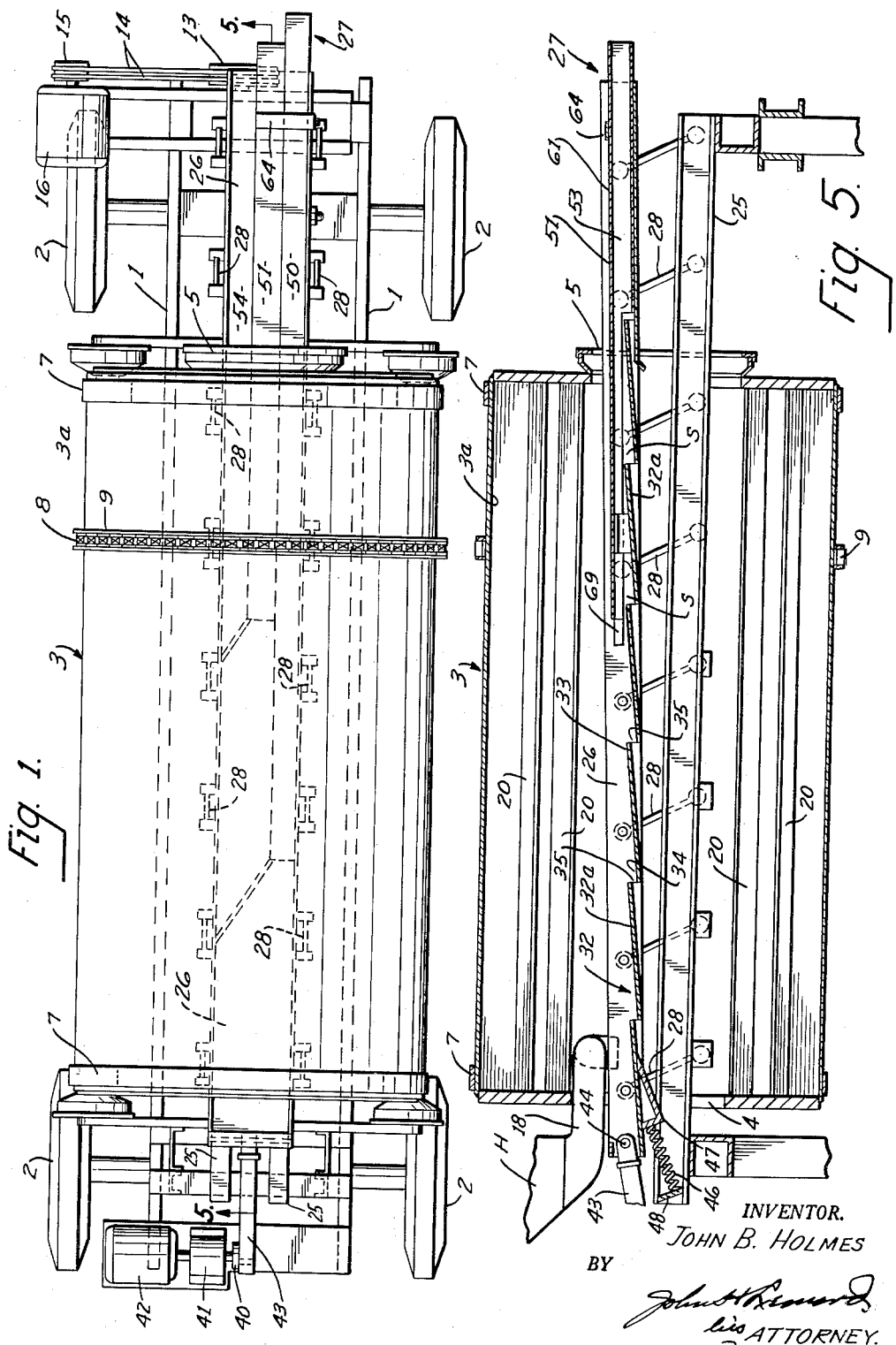
FIG. 1 is a top plan view of the apparatus embodying the principles of the present invention.

Referring next to FIGS. 18 and 19, a modified relation of the trough and drum of FIG. 1 is illustrated. Heretofore, as pointed out in connection with FIGS. 1 and 2, the coarser particles of sand and gravel tend to be discharged by the paddles at the inlet end of the drum, and the finer particles tend to remain suspended progressively longer and migrate toward the discharge end of the drum. Accordingly, the paddles at the discharge end of the drum deliver finer sand to the trough than do those at the inlet end of the drum. However, in many cases, there is a large amount of very fine sand and it is desirable that the extremely fine sand have a longer path of travel than the coarser sand to effect better separation of the water therefrom. For this purpose, the arrangement shown in FIGS. 18 and 19 is desirable. Therein, the drum, indicated at 78, and the trough, indicated at 79, are the same as those in FIGS. 1–5, except that the drum is tilted so that it slopes downwardly from the discharge end of the trough 79, and the material is fed into the drum at its higher end, which is adjacent the discharge end of the trough. In short, it is as though the left-hand end of the drum in FIG. 2 were lowered so that it was below the right-hand end and then sand were fed into the drum at the right-hand end in FIG. 2.

With all parts operating as heretofore described, the coarser particles of sand, indicated at 80, tend to separate out of the slurry and be discharged into the trough 79 at the right-hand end of the drum near the discharge end of the trough, and the next finer particles 81 discharge into the trough at a greater distance from the discharge end of the trough. The still finer particles, indicated at 82, are carried nearer to the discharge end of the drum which is at the lower end and most remote from the discharge end of the trough 79. Thus, the coarse particles 80 fall into the trough 79 through the opening 83 near the discharge end 84 of the trough. These coarse particles require little time for separation from the slurry as the slurry readily runs out of them. Next, the progressively finer particles 81 fall in the trough through the opening 85 which is a greater distance from the discharge end of the trough and thus have a longer path of travel during which the slurry can be removed. The still finer particles 82 drop into the remaining open portion of the trough, as indicated at 86, and which is farthest removed from the discharge end 84. Thus, the finest material has the longest path of travel during separation from the slurry. This is very desirable as it takes longer to separate the slurry from the extremely fine particles than from the coarser particles. In all other respects, the apparatus is the same as heretofore described.

Thus it is seen that different degrees of separation of the slurry and gradation of the sand can be obtained by changing the length and width of the inlets of the portions of the trough, whether such portions are provided by using deflectors or by using a plurality of supplemental trough portions of different lengths placed one above the other. Also, different effects can be obtained by changing the slopes of the upper and lower trough portions in the structures of FIGS. 15–17.

It has been found that with these arrangements, the water such as customarily is so muddy that it would have to be returned to the settling basin or sump and there remain for a considerable while before reuse, can be reused immediately and will produce cleaner sand than is obtained with conventional methods by producing relatively clear water into the sand as it is passed into the drum. Further, sufficiently accurate grading for many purposes is obtained by the same operation at no additional cost.

In the foregoing description, the invention has been described in relation to the separation of bank run sand and gravel from water. However, it is to be understood that it applies also to the sparation of various types of solid, granular materials from slurries of liquids and fine contaminating solids. For example, in the so-called heavy media methods of separation, the heavier iron ore is to be separated from the liquid in which it is suspended and the principles of the present invention are applicable thereto. The use of the words "sand" and "gravel" is not meant to limit the invention to the specific ingredients sand, gravel and water, but sand is to be interpreted as any solid, granular material, and water is to be interpreted as any liquid suspension and carrying medium, or the medium mixed with material during its agitation in the drum.

Having thus described my invention, I claim:

1. An apparatus for washing and conveying loose material and removing the washing liquid therefrom, and comprising a power driven, generally horizontal rotary drum having an inlet opening at one end for admitting loose material and liquid, a discharge opening at the other end for discharging liquid therefrom, and an imperforate peripheral wall, buckets carried at the inner peripheral wall of the drum and rotatable therewith for hoisting a mixture of the liquid and the loose material upwardly at one side of the drum and for pouring off free liquid, accumulated on top of the material settling out in the buckets during their rise, as they approach the upper portion of their path of rotational movement with the drum, and for discharging the mixture of residual liquid and loose material further along the upper portion of said path, an elongated conveyor extending lengthwise of the drum and having a discharge end, a bottom wall, and an opening at the top through which the residual liquid and loose material discharged from the buckets can be received on the bottom wall, power means to vibrate the conveyor generally endwise so as to cause the material to advance toward said discharge end of the conveyor, said bottom wall comprising a series of imperforate wall portions arranged in a row endwise of the conveyor, each portion sloping upwardly in a direction toward the discharge end of the conveyor at an angle to the bottom wall as a whole so that the upper end of each portion is spaced above the level of the lower end of the portion next in succession to it in said direction, said conveyor having liquid discharge passages adjacent the lower ends of the portions, and said portions being positioned relative to each other so that the material discharged from each portion falls onto the imperforate wall of the portion next in succession to it in said direction.

2. The apparatus according to claim 1 wherein said bottom wall as a whole also slopes upwardly from the horizontal in a direction toward the discharge end of the conveyor.

3. The apparatus acording to claim 2 wherein the bottom wall of the conveyor, as a whole, slopes upwardly from the horizontal from said other end of the drum toward said one end of the drum for discharging the material at said one end of the drum.

4. An apparatus according to claim 1 characterized in that the opening into said conveyor terminates laterally of the drum inwardly from the path of the buckets at the rising side of the drum in spaced relation to the path such that the free liquid poured out of the buckets misses the opening, and the mixture of settled out material and residual liquid falling from the buckets drops through said opening.

5. An apparatus according to claim 1 wherein the power means includes means to cause the conveyor to move in the direction of advance of the material slower than it returns in the opposite direction.

6. The apparatus according to claim 1 wherein the power means include yieldably resilient means urging the conveyor in the direction of advance of the material.

7. An apparatus according to claim 1 wherein said passages are, respectively, between said upper end of each portion and the lower end of the portion next succeeding it in a direction toward said discharge end of the conveyor.

8. An apparatus according to claim 7 wherein the upper end of each portion is in upwardly spaced relation to the lower end of its next succeeding portion and thereby provides between the portions a passage which is open and unobstructed for at least a major portion of the width of the bottom wall.

9. The apparatus according to claim 1 wherein the conveyor has a plurality of elongated trough portions which extend endwise thereof and are disposed side by side and are generally segregated from each other, and each trough portion is arranged to receive the material from the buckets at a location, lengthwise of the drum different from each of the other trough portions whereby grading of the material to sizes results.

10. The apparatus according to claim 1 wherein the conveyor has at least two elongated trough portions which extend endwise of the drum and are arranged in spaced relation, one above the other, the upper one of the trough portions extends from the discharge end of the conveyor part way only of the length of said other trough portion.

11. An apparatus for separating the residual liquid from wet loose material and comprising a conveyor, said conveyor including an elongated trough having a bottom wall, supporting means supporting the trough for vibration endwise and with its bottom wall sloping upwardly in a direction from one end toward the other end of the trough, means for supplying loose granular material wetted with residual liquid onto the bottom wall near said one end, power means to effect vibration of the trough so as to cause the material to advance in a direction toward said other end, said bottom wall being in the form of a series of imperforate wall portions arranged in a row endwise of the trough, each portion sloping upwardly endwise toward said other end at a greater angle than the slope of the bottom wall as a whole, said portions being arranged with the upper end of each portion spaced above the level of the lower end of the portion next in succession to it in said direction and defining between the ends a discharge passage for liquid flowing toward the lower end of the trough off of the top of the material disposed on the bottom wall of said trough, and said portions being positioned relative to each other so that the material discharged from each portion falls onto the imperforate wall of the portion next adjacent to it in said direction of advance of the material.

12. An apparatus according to claim 11 wherein the supporting means comprise parallel rocker link arms of equal length pivotally connected at their upper ends to the trough for rocking relative thereto about parallel axes extending transversely of the trough, and pivotally connected at the lower ends to the support for rocking about axes parallel to the first axes, and the power means vibrate the trough endwise by oscillation thereof about the lower ends of the arms.

13. The method of treating a mixture of loose material, contaminating fine solids and residual liquid from a mixture thereof and comprising continuously supplying from a source a mixture of loose material and a residal slurry of liquid and suspended fine solids onto the lower end of an imperforate supporting surface which is inclined upwardly from said lower end, supporting the mixture of material and residual slurry on said imperforate supporting surface, continuously vibrating the material and residual slurry mixture so as to throw the material and residual slurry upwardly and forwardly continuously in a direction toward the upper end of the imperforate supporting surface in loosened condition in repeated short increments of travel and to cause the material to pass in loosened condition downwardly through the residual slurry and to settle out of the residual slurry onto the imperforate supporting surface and to be partially compacted thereon, for an instant during each vibration, thereby leaving the residual slurry on the upper surface of the material, continuously draining the residual slurry from the upper surface of the settled material, and continuing the vibration until the material is substantially free from slurry and passes off of the upper end of the supporting surface.

References Cited in the file of this patent

UNITED STATES PATENTS

| | | |
|---|---|---|
| 807,900 | Batley | Dec. 19, 1905 |
| 973,363 | Major | Oct. 18, 1910 |
| 1,150,876 | Nichols | Aug. 24, 1915 |
| 2,119,414 | Blanchard | May 31, 1938 |
| 2,197,770 | Pruyn | Apr. 23, 1940 |
| 2,329,333 | Carter | Sept. 14, 1943 |
| 2,503,875 | Kern | Apr. 11, 1950 |